(12) United States Patent
Bass

(10) Patent No.: US 7,073,875 B2
(45) Date of Patent: Jul. 11, 2006

(54) BRAKE FLUID CIRCULATION

(75) Inventor: Richard Arnold Bass, Leamington Spa (GB)

(73) Assignee: A P Racing Limited (GB)

(*) Notice: Subject to any disclaimer, the term of this patent is extended or adjusted under 35 U.S.C. 154(b) by 0 days.

(21) Appl. No.: 10/240,019

(22) PCT Filed: Mar. 28, 2001

(86) PCT No.: PCT/GB01/01357

§ 371 (c)(1),
(2), (4) Date: Feb. 10, 2003

(87) PCT Pub. No.: WO01/74637

PCT Pub. Date: Oct. 11, 2001

(65) Prior Publication Data

US 2003/0150680 A1    Aug. 14, 2003

(30) Foreign Application Priority Data

Mar. 30, 2000 (GB) .................................. 0007748.7
Oct. 17, 2000 (GB) .................................. 0025519.0

(51) Int. Cl.
*B60T 8/44* (2006.01)
(52) U.S. Cl. ................... 303/114.1; 188/264 R; 188/264 F
(58) Field of Classification Search .......... 303/113.3, 303/113.5, 114.1, 114.2, 115.1; 60/456, 60/591; 188/264 R, 71.6, 264 A, 264 F
See application file for complete search history.

(56) References Cited

U.S. PATENT DOCUMENTS

| | | | | |
|---|---|---|---|---|
| 4,444,440 A | * | 4/1984 | Farr | 303/50 |
| 4,483,144 A | * | 11/1984 | Steffes | 60/548 |
| 4,559,780 A | * | 12/1985 | Taft | 60/548 |
| 4,738,109 A | * | 4/1988 | Miller et al. | 60/578 |
| 4,799,575 A | * | 1/1989 | Kroniger | 188/71.6 |
| 5,310,252 A | * | 5/1994 | Stewart, Jr. | 303/84.2 |
| 5,350,223 A | * | 9/1994 | Stewart, Jr. | 303/84.2 |
| 5,649,746 A | * | 7/1997 | Stewart, Jr. | 303/84.2 |
| 5,954,166 A | * | 9/1999 | Maeda | 188/264 P |
| 6,085,523 A | * | 7/2000 | Buckley et al. | 60/585 |
| 6,135,580 A | * | 10/2000 | Denning | 303/151 |
| 6,382,374 B1 | * | 5/2002 | Iwai et al. | 188/345 |
| 2003/0200750 A1 | * | 10/2003 | Kusano et al. | 60/562 |

* cited by examiner

Primary Examiner—Devon Kramer
(74) Attorney, Agent, or Firm—Young & Basile, P.C.

(57) ABSTRACT

A brake circuit has a brake connected with a master cylinder via a brake application line. The brake master cylinder has a first chamber in which brake fluid is pressurized on movement of a first piston in a brake applying direction by an operating device. The first chamber is connected via a first port and a non-return valve with the brake application line of the circuit. A second chamber is in communication with the brake return line of the circuit via a second port and has a second piston moveable by the brake operating device in brake applying and releasing directions. The second chamber is also in communication with a reservoir via a third port when the second piston is in a fully released position. The second chamber is arranged to draw-in brake fluid from the brake return line on movement of the second piston in a brake releasing direction by the operating device to establish a connection with the associated reservoir via the third port to allow escape of aerated fluid into the reservoir when the second piston is in the fully released position.

12 Claims, 8 Drawing Sheets

BRAKE FLUID CIRCULATION

This invention relates to arrangements for circulating brake fluid within a brake circuit to prevent vaporisation and promote cooling of the fluid and associated brake actuator.

Such arrangements are already known, for example, U.S. Pat. Nos. 5,310,252 and 5,350,223 disclose brake circuits for disc brakes which circuits include non-return valves to promote circulation of the brake fluid.

It is an object of the present invention to provide an improved arrangement for promoting circulating of brake fluid to promote cooling.

Thus in accordance with a first aspect of the invention there is provided a brake circuit comprising brake means connected with a master cylinder via a brake application line and a brake return line, the brake master cylinder having a first chamber in which brake fluid is pressurised on movement of a first piston in a brake applying direction by an operating means, the first chamber being connected via a first port and a non-return valve with the brake application line of the circuit, and a second chamber in communication with the brake return line of the circuit via a second port and having a second piston moveable by the brake operating means in brake applying and releasing directions, the second chamber also being in communication with a reservoir via a third port when the second piston is in a fully released position, the second chamber being arranged to draw-in brake fluid from the brake return line on movement of the second piston in a brake releasing direction by the operating means and establishing a connection with the associated reservoir via the third port to allow escape of aerated fluid into the reservoir when the second piston is in the fully released position.

Such a brake circuit sets up a circulation of brake fluid into and out of the master cylinder since on each application and release of the brake means a small volume of fluid is displaced from the first chamber into the brake application line and a small volume drawn out of the brake return line into the second chamber.

This circulation of brake fluid assists in the cooling of the brake fluid and brake means which is particularly important in high performance brakes where brake fluid in closed circuit brakes which do not have such a circulation of fluid can be raised to high temperatures which can result in the boiling/vaporisation of the brake fluid and subsequent brake failure.

It is an important feature of the invention that the second chamber of the master cylinder is connected with the brake return line without the intervention of a non-return valve. This significantly improves the ability of any aerated fluid to pass to the reservoir during release of the brake means and prevents the trapping of any brake pressure in the brake circuit on release of the brake means.

Also because there is no non-return valve in the connection with the second chamber, the first chamber non-return valve can be 100% sealed in the reverse direction thus preventing leaking back of fluid into the first chamber during release of the brake means and hence ensuring the maximum amount of fluid is re-circulated on each application of the brake means.

In accordance with a second aspect of the invention, there is provided a master cylinder for use in a brake circuit according to the first aspect.

In a further development of the invention, it has been found that when a brake having two or more brake actuators connected in parallel is used in a brake circuit which circulates brake fluid, such as those in accordance with the first aspect of the invention, there can be a tendency for brake fluid to circulate within the brake. This reduces the overall efficiency of the circulating brake fluid circuit.

It is a further object of the invention to provide an improved arrangement for promoting circulating of brake fluid to promote coding which overcomes or at least mitigates this problem.

Thus, in accordance with a third aspect of the invention, there is provided a brake circuit comprising brake means connected with a master cylinder via a brake application line and a brake return line, the brake circuit comprising non-return valve means arranged such that on application of the brakes a quantity of brake fluid is delivered to the brake means via the brake application line and that on release of the brakes a quantity of brake fluid is drawn from the brake means via the brake return line, the brake means comprising at least one brake having two or more brake actuators connected in parallel, in which non-return valve means are provided to prevent or reduce circulation of the brake fluid within the brake.

The arrangement according to the third aspect of the invention improves the overall efficiency of the brake fluid circulation about the brake circuit by preventing, or at least reducing, circulation of the brake fluid within the brake itself. This results in improved cooling.

In a preferred embodiment, the brake circuit is a brake circuit in accordance with the first aspect of the invention.

In accordance with a fourth aspect of the invention, there is provided a brake for use in a brake circuit in accordance with the third aspect of the invention, the brake comprising two or more actuators connected in parallel and non-return valve means adapted to prevent or reduce circulation of brake fluid within the brake.

Several embodiments of the present invention will now be described, by way of example only, with reference to the accompanying drawings in which.

Figure 1:
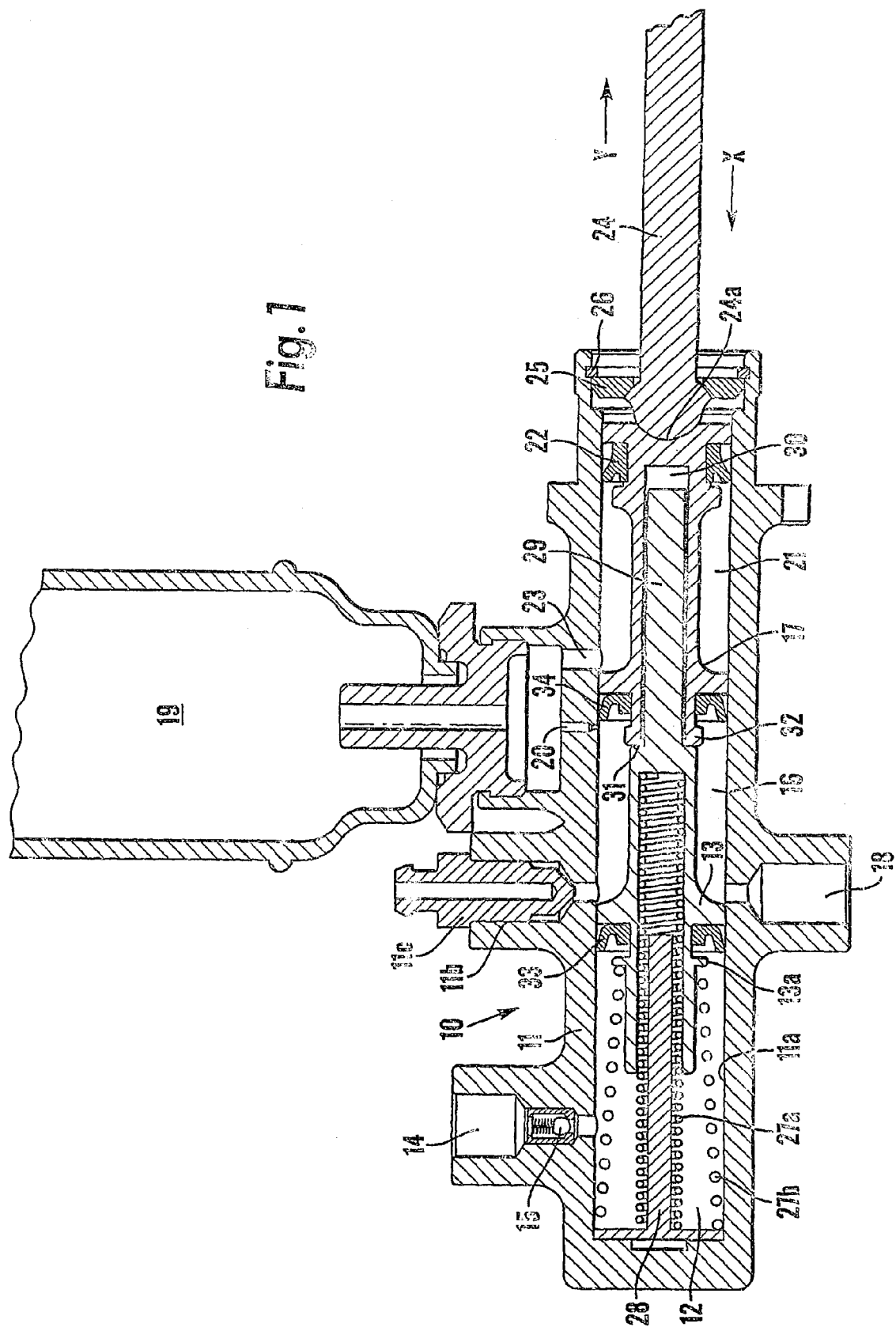
FIG. 1 shows a cross section through a master cylinder for use in a brake circuit in accordance with the present invention.
Figure 2:
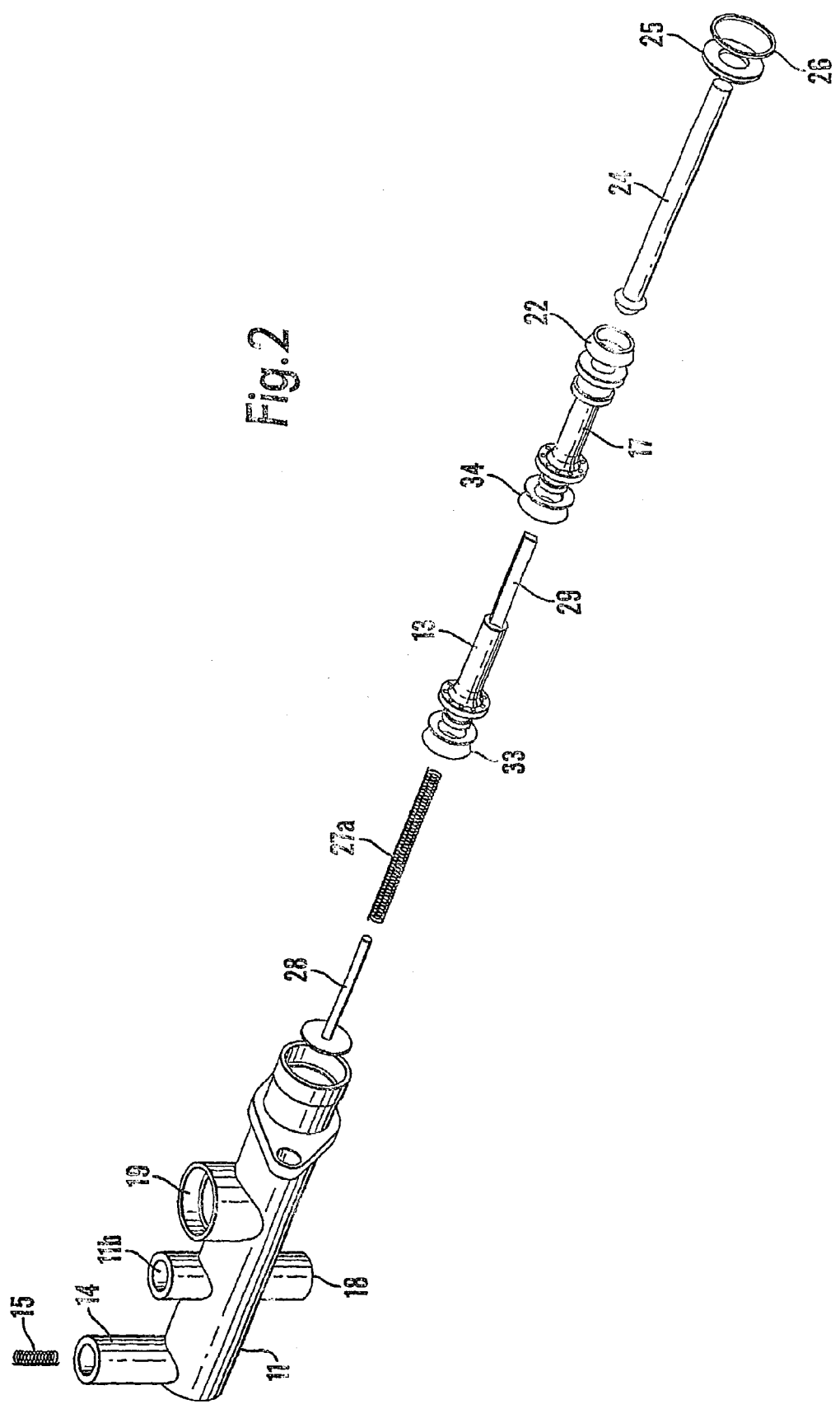
FIG. 2 shows an exploded perspective view of the master cylinder of FIG. 1.

Referring to FIGS. 1 and 2 a brake master cylinder 10 has a body 11 at one end of which a first clamber 12 is defined by a first piston 13 slideable in bore 11a. First chamber 12 is connected with an associated brake circuit (shown in FIG. 3) via first port 14 which houses a non-return valve 15 which only allows the flow of fluid out of chamber 12.

A second chamber 16 is defined within bore 11a between first piston 13 and second piston 17. This second chamber communicates with the brake circuit via a second port 18 and with a fluid reservoir 19 via a third port 20. A bleed port 11b housing a bleed screw 11c also opens into second chamber 16.

A third chamber 21 is formed within bore 11a between the second piston 17 and the other end of the body 11 and is sealed by a main seal 22. The third chamber also communicates with the reservoir 19 via a fourth port 23 which ensures that the third chamber 21 remains filled with hydraulic fluid at all times thus preventing the ingress of air into the master cylinder.

Both the first and second pistons 13 and 17 are displace able to the left from the position shown in FIG. 1 by an actuating rod 24 which is connected with an associated brake pedal 40 and has a part-spherical end 24a which pushes (but cannot pull) on the second piston 17. The rod is held captive within the master cylinder body by a retaining washer 25 and circlip 26. The fist piston 13 is biased to the right as viewed in FIG. 1 by an inner coil spring 27a which extends within the piston 13 and is supported on a stabilising rod 28 and an outer tapering coil spring 27b which acts against an abutment 13a on piston 13. As shown in FIG. 2 only spring 27a may be used in certain applications. Piston 13 is provided with a square section extension rod 29 which extends within a bore 30 in the second piston 17. An annular shoulder 31 on first piston 13 engages an annular abutment 32 on the front part of second piston 17 so that the two pistons can move along bore 11a as a unit.

The first piston 13 has a seal 33 which seals the first chamber 12 as piston 13 is moved to the left in FIG. 1 but which allows leakage of fluid round seal 33 as the first piston moves to the right during a brake release movement. Similarly second piston 17 carries a seal 34 which seals second chamber 16 during a brake application movement which, when in the fully released position shown in FIG. 1, allows communication between the second chamber 16 and the reservoir 19 via the third port 20.

Figure 3:
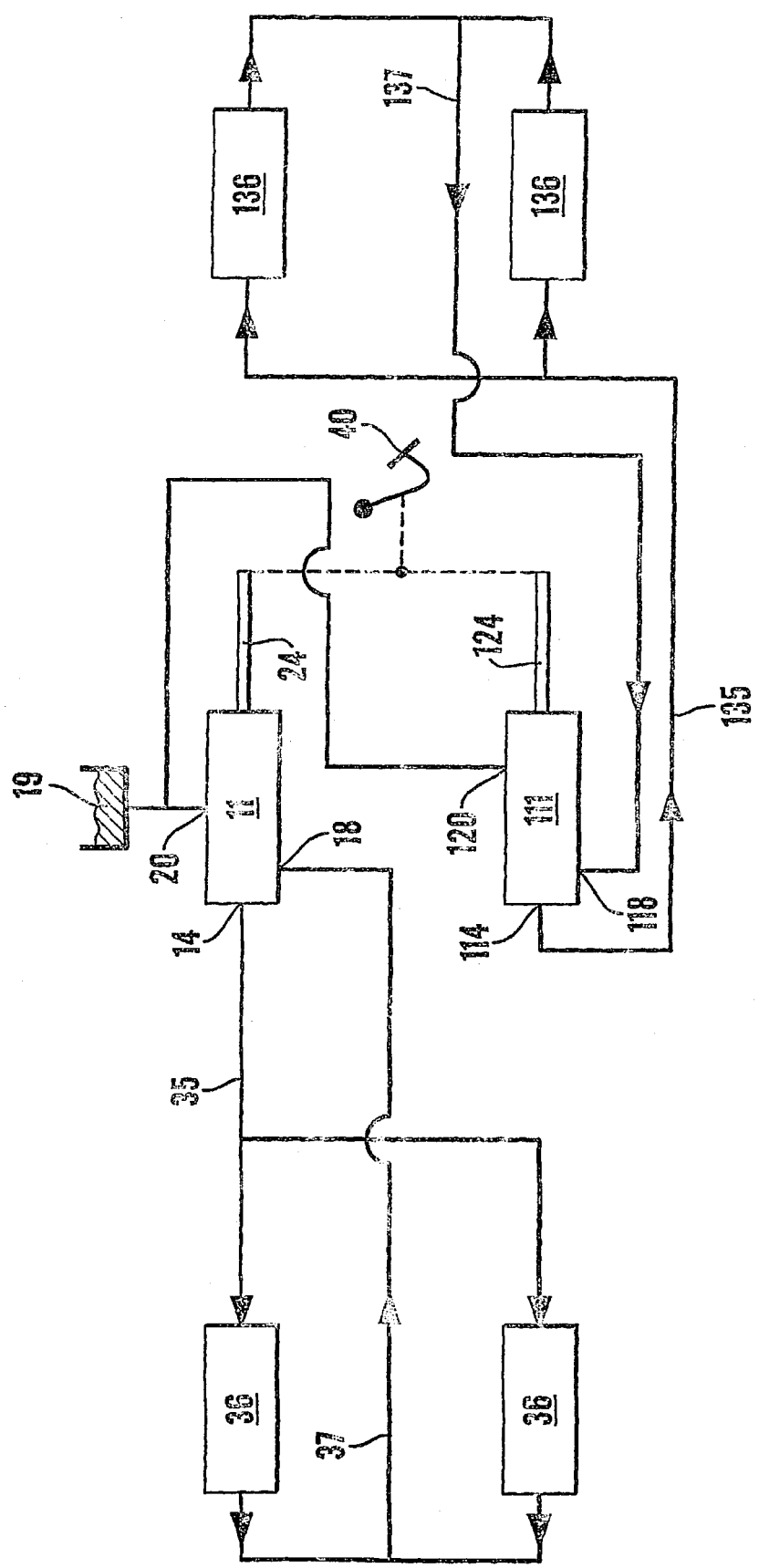
FIG. 3 shows a block diagram of a vehicle braking circuit employing two master cylinders in accordance with FIG. 1.

Referring to the brake circuit shown in FIG. 3, this shows master cylinder 11 and a second master cylinder 111 which is identical with master cylinder 11. Both master cylinders are actuated from a common brake pedal 40 via push rods 24 and 124 respectively. A brake balancing pedal mechanism of the form shown in UK patent GB-B-2309066 may be used to connect rods 24 and 124 with pedal 40.

The first port 14 of master cylinder 11 is connected with a brake application line 35 which is connected in parallel with front disc brakes 36. A brake return line 37 is connected at one end in parallel with brakes 36 and at the other end with second port 18 of master cylinder 11. Reservoir 19 is connected with third port 20.

In a similar fashion second master cylinder 111 has a first port 114 which is connected with a brake application line 135 which communicates in parallel with rear disc brakes 136. A brake return line 137 is connected at one end in parallel with brakes 136 and at the other end with second port 118 of master cylinder 111. Third port 120 of master cylinder 110 is connected with reservoir 19.

Thus the brake circuit has two master cylinders 11 and 111 which operate separate front and rear brake sub-circuits. Although both front and rear brakes 36 and 136 are described above as being disc brakes this is not essential and, for example, rear brakes 136 could be drum brakes.

The operation of master cylinder 11 in connection with front brakes 36 will now be described in detail. It is appreciated that the operation of second master cylinder 111 which operates rear brakes 136 is identical.

Referring to master cylinder 11, FIG. 1 shows the master cylinder in the fully brake released position in which the pistons have moved to their maximum lift band position. To apply the brakes the brake pedal 40 is depressed which moves the push rod 24 to the left as indicated by arrow X. This moves both the first piston 13 and the second piston 17 to the left via the abutment between shoulder 31 and annular abutment 32.

During brake application, first chamber 12 is pressurised by the movement of first piston 13 to the left and hence pressurised fluid is passed to brake application line 35 via non-return valve 15. Second chamber 16 is also pressurised by return line 37. This pressure cannot leak back to the reservoir 19 as seal 34 has sealed off port 20. Hence front brakes 36 are applied.

When the brake pedal 40 is released pushrod 24 moves to the right as indicated in arrow Y in FIG. 1. This allows the second piston to move to the right under brake pressure in the second chamber bringing abutment 32 out of contact with shoulder 11 on the first piston 13. Thus the volume of second chamber 16 is increased and hence brake fluid is sucked into second chamber 16 from the brake return line 37 via port 18. When piston 17 reaches the FIG. 1 position communication is established between the second chamber 16 and the reservoir 19 and fluid can then flow from chamber 16 to the reservoir. In this condition any aerated fluid tends to rise from chamber 16 into the reservoir.

When the pressure in second chamber 16 falls as the third port 20 is opened the first piston 13 is able to move to the right under the action of springs 27a and 27b to again bring shoulder 31 into contact with annular abutment 32. This movement of the first piston to the right also assists in promoting flow of aerated fluid from second chamber 16 into the reservoir 19

Thus, as will be appreciated, during a brake application a volume of fluid is displaced into the brake actuating circuit from the first chamber 12 by the master cylinder and during brake release a volume of fluid is sucked out of the brake actuating cylinder into second chamber 16. This promotes a circulation of brake fluid around the brake circuit which assists in preventing vaporisation of the fluid and also promotes general cooling of the brake itself.

Since flow of fluid from the brake actuating circuit into the second chamber 16 is not via a non-return valve there is no tendency for brake fluid pressure to be trapped in the brake circuit hence a quick release of brakes is achieved. Also, there is a relatively unrestricted flow of fluid into second chamber 16 which again assists in venting any aerated fluid from the system.

As will be appreciated, a single master cylinder can be used to operate the front and rear brakes 36 and 136 of FIG. 3. Also, instead of connecting the brakes 36 and 136 in parallel with their associated master cylinders they could be connected in series.

Figure 4:
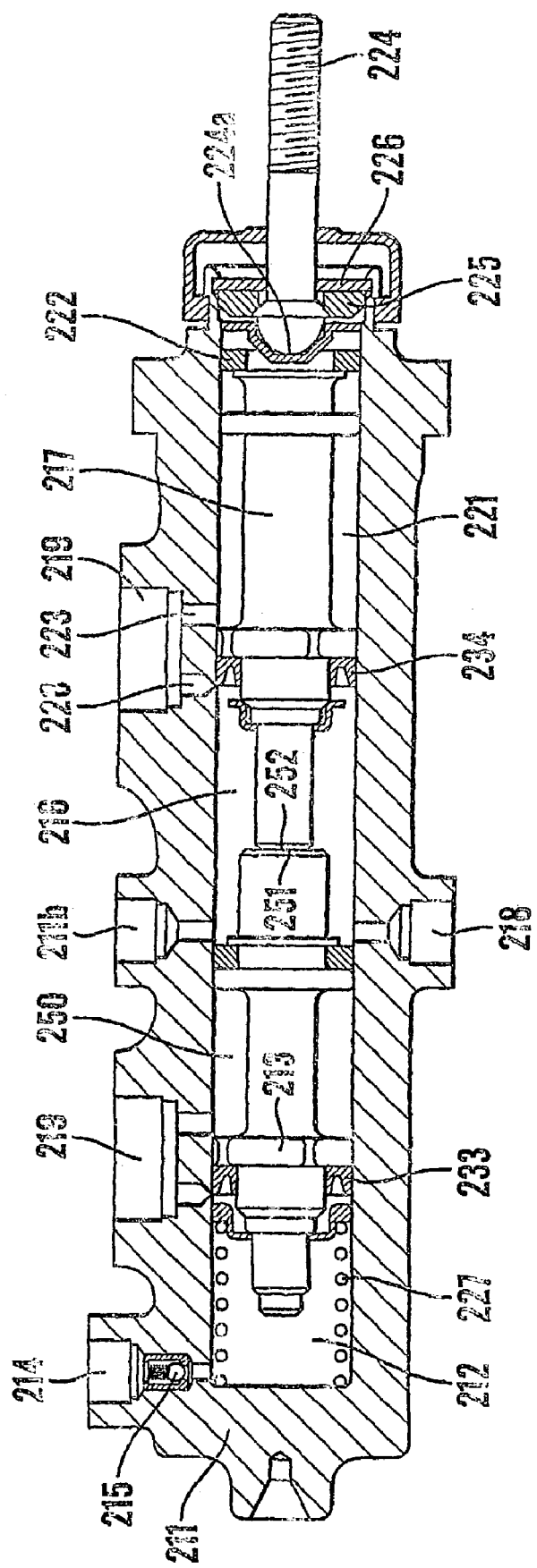
FIG. 4 shows a standard tandem master cylinder modified in accordance with the present invention.

Whilst the present invention has been described above in relation to a specially constructed master cylinder it will be appreciated that a standard tandem master cylinder may be modified to provide a similar functions FIG. 4 shows such a construction in which components which provide the same function as the components of FIG. 1 have had their reference numerals increased by 200.

In the FIG. 4 arrangement first and second chambers 212 and 216 respectively are separated by a fourth unpressurised chamber 250 which is connected with reservoir 19. Normally the first and second chambers 212 and 216 are connected to front and rear braking circuits respectively to provide the normal tandem master cylinder operation. When used in accordance with the present invention these chambers are connected to the brake application line 35 and brake return line 37 respectively as previously described in relation to FIGS. 1 and 3. The operation of the dual master cylinder when connected in this manner is the same as the master cylinder previously described in relation to FIG. 1 with the first and second pistons abutting each other at surfaces 251 and 252 respectively to provide equivalent abutments to the components 31 and 32 of FIG. 1.

Figure 5:
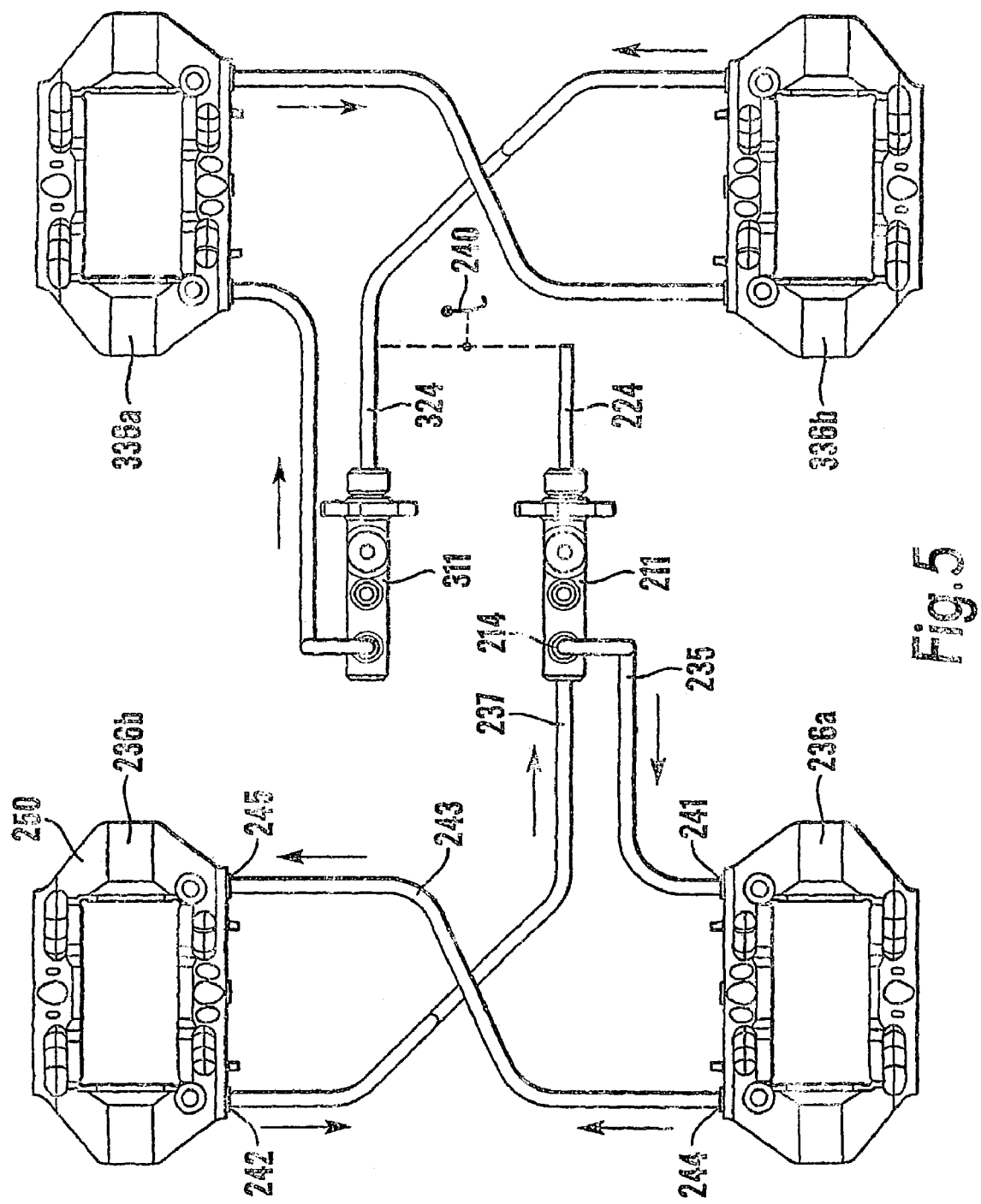
FIG. 5 shows a further brake circuit in accordance with the invention.
Figure 6:
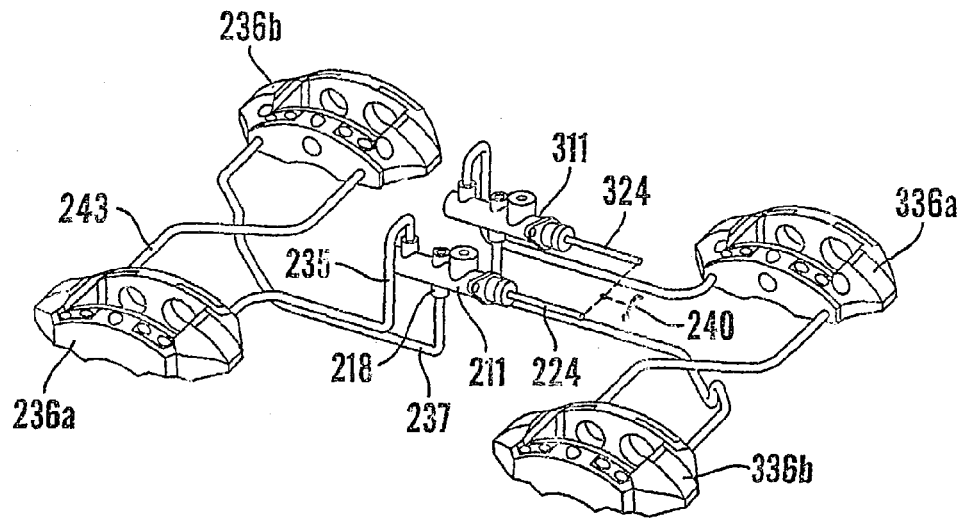
FIG. 6 is a perspective view of the die brake circuit of FIG. 5.

FIGS. 5 and 6 show a further brake circuit in accordance with the invention. Components which provide the same function as the components of FIG. 3 are given the same reference numeral but increased by 200.

The brake fluid circuit of FIGS. 5 and 6 is similar to the circuit of FIG. 3 except that the master cylinders 211, 311 are connected to their respective brake means in series.

The construction and operation of the brake master cylinders 211 and 311 is the identical to the brake master cylinders 11, 111 of the brake fluid circuit described above with reference to FIG. 3 and so will not be described again in detail. However, there follows a brief description of the connection of the first master cylinder 211 with the front brakes 236a, 236b. It will be appreciated that the second master cylinder 311 and the rear brakes 336a, 336b are similarly connected and will function in a similar fashion.

The first master cylinder 211 has a first chamber which is connected to an input port 241 of a first of the front brakes 236a via brake application line 235. A second chamber of the master cylinder is connected to an output port 242 of a second of the front brakes 236b by the brake return line 237. The first and second front brakes are interconnected via an intermediate brake line 243 which connects an output port 244 of the first front brake 236a to an input port 245 of the second front brake 236b.

In operation, when the brakes are applied pressurised fluid will be supplied from the first chamber of the master cylinder 211 to the application line 235 and when the brakes are released fluid will be drawn out from the return line 237 into the second chamber of the master cylinder. The fluid will thus circulate from the first chamber of the master cylinder to the first front brake 236a via the application line 235, then from the first front brake 236a to the second front brake 236b via the intermediate brake line 243 and finally from the second front brake 236b to the second chamber of the master cylinder via the brake return line 237.

The brake circuit, therefore, provides for a circulation of the brake fluid within the brake circuit as the brakes are applied and released. During use, particularly if the vehicle is used in racing conditions, the brakes are regularly being applied and released and there will be a correspondingly regular movement of brake fluid about the circuit.

Figure 7:
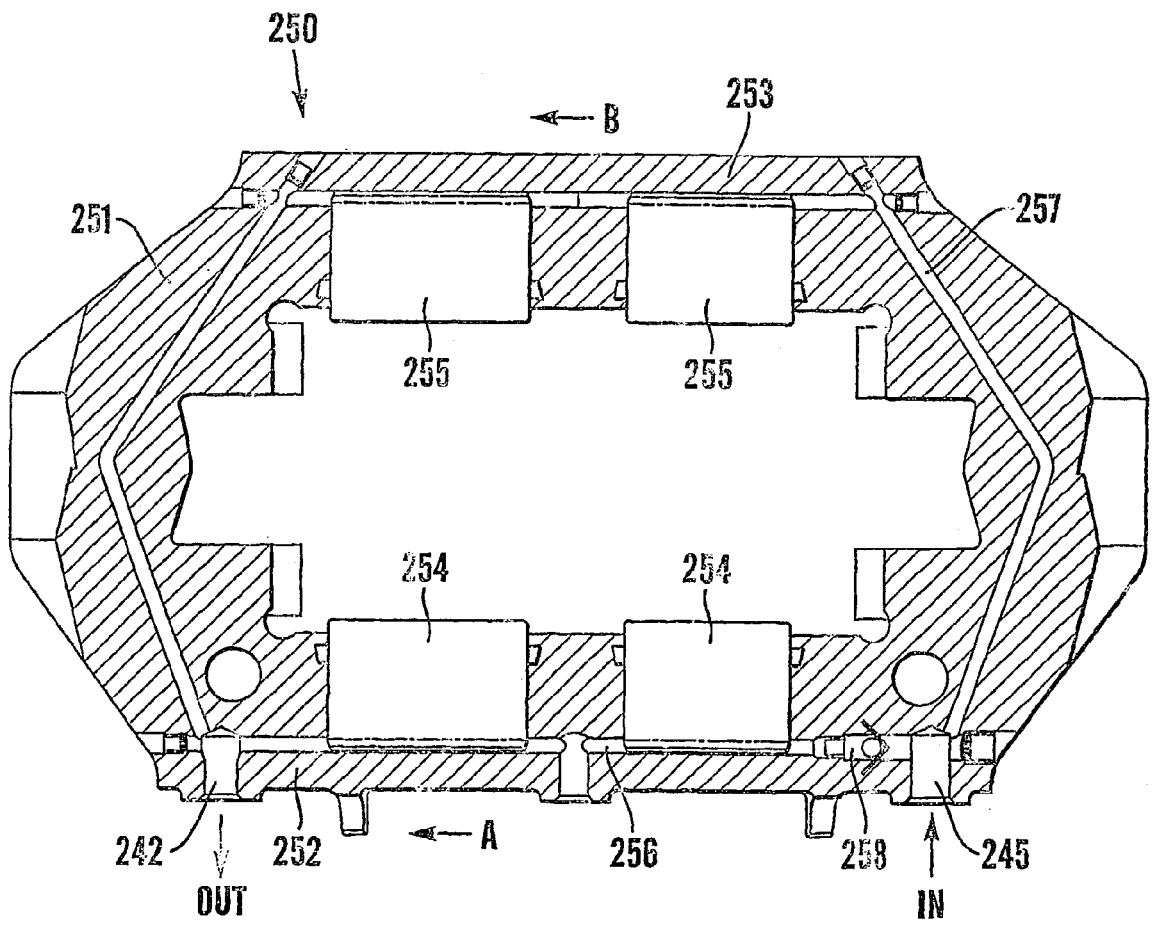
FIG. 7 shows a cross sectional through a brake caliper for use with the brake circuits of FIG. 1 or FIG. 5.

All the brakes shown in the brake circuit of FIGS. 5 and 6 are disc brakes comprising calipers of the opposed piston type. FIG. 7 shows a cross section of a caliper 250 of the second front brake 236b. It will be appreciated that the callipers of all the brakes will be essentially the same, though there may be some differences in detail owing to the fact that the calipers are modified for use on the left or right hard side of the vehicle as required.

The caliper 250 comprises a body 251 having two limbs 252, 253 which in use are positioned one on either side of a brake disc. A first limb 252 has a first pair of actuators in the form of piston and cylinder assemblies 254, whilst the other limb 253 has a second pair of actuators in the form of opposed piston and cylinder assemblies 255. The caliper further comprises a brake fluid inlet 245 and a brake fluid outlet 242 which are connected in parallel by two brake fluid passages 256, 257. A first of the passages 256 supplies brake fluid to the piston and cylinder assemblies 254 in one of the limbs 252, whilst the other passage 257 supplies brake fluid to the piston and cylinder assemblies 255 in the other of the limbs 253.

As so far described, caliper 250 is conventional and it will be noted that the fluid passages 256, 257 form a complete fluid circuit within the caliper. It has been found that when a caliper of this type is used in a brake circuit in which means are provided to circulate the brake fluid, there is a tendency for fluid to circulate or recirculate within the caliper itself, moving from one passage 256, 257 to the other 257, 256, rather than flowing through the brake and around the main brake circuit as the brakes are operated.

To overcome this problem, a non-return valve 258 is provided in the fluid passage 256. The valve 258 ensures that brake fluid can only flow through the passage 256 in the direction of arrow A, i.e. from the inlet 245 towards the outlet 242. The non-return valve 258 can be of any suitable form but preferably is of the ball and spring type.

In operation, when the brakes are applied pressurised fluid will be supplied from the first chamber of the master cylinder 211 via the application lie 235, the first front brake 236a and the intermediate brake line 243 to the brake fluid inlet 245 of the caliper 250. Pressurised fluid will then flow along the first brake fluid passage 256 through the non-return valve 258 to the piston and cylinder assemblies 254 in the limb 252. Pressurised fluid will also flow in the direction of arrow B along the passage 257 to the piston and cylinder assemblies 255 in the other limb 253.

When the brakes are released, brake fluid will be drawn into the second chamber of the master cylinder from the brake return line 237 which is connected to the brake fluid outlet 242 of the caliper 250. The brake fluid within the first brake fluid passage 256 is constrained to move in the direction of arrow A because of the non-return valve 258 and hence will tend to move towards and out of the outlet 242 into the return line 237. The brake fluid in the passage 257 is prevented from returning through the inlet 245 because of the non-return valve which acts between the first chamber of the master cylinder 211 and the brake application line 236 and so will tend to flow in the direction of arrow B towards the outlet 242.

It is possible that when the brakes are released, the fluid in the passage 257 could flow in the opposite direction to arrow B and into the passage 256 through the non-return valve 258. However, in order for this to happen the fluid must open the non-return valve 258 overcoming the resistance inherent in the valve. Thus there will be a tendency for the fluid in passage 257 to flow in the direction of arrow B towards the outlet which is the path of least resistance.

It will be understood that the brake caliper 250 described with reference to FIG. 7 could also be used in the brake fluid circuit described with reference to FIG. 3 in which the brake means are connected to the master cylinder in parallel.

Figure 8:
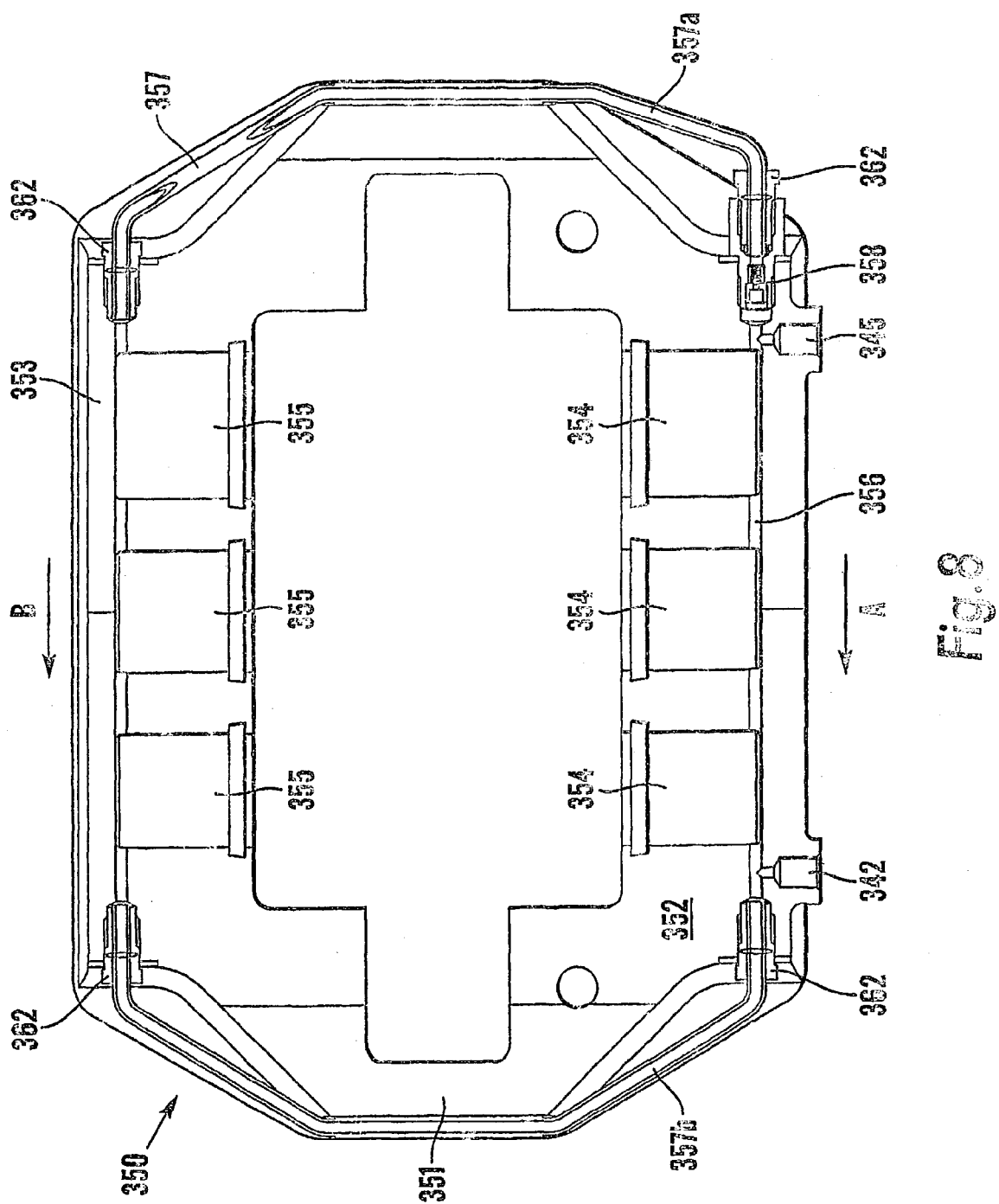
FIG. 8 is a view similar to that of FIG. 7 showing a modified brake caliper.

FIG. 8 shows an alternative form of opposed piston caliper 350 that can be used with the brake fluid circuits of FIG. 3 or FIGS. 5 and 6. The caliper 350 is similar to the caliper 250 shown in FIG. 7 and the same reference numerals but increased by 100 are used to identify components which perform the same function as those in FIG. 7.

Caliper 350 comprises a body 351 having two limbs 352, 353, each of the limbs having three piston and cylinder assemblies 354, 355 respectively.

A brake fluid inlet 345 and a brake fluid outlet 342 are connected in parallel by two brake fluid passages 356, 357. A first of the passages 356 supplies brake fluid to the piston and cylinder assemblies 354 in the limb 352. A second passage 357 supplies brake fluid to the piston and cylinder assemblies 355 in the other limb 353.

In this case, the brake fluid passage 357 is formed in part by two external pipes 357a, 357b which interconnect fluid galleries formed in either limb 352, 353 in a manner known in the art. The pipes 357a, 357b being connected to the fluid galleries by means of threaded unions 362.

A non-return valve 358 is provided in the passage 357 to ensure that brake fluid can only flow through the passage 357 in the direction of arrow B.

The operation of the caliper 350 is much the same as for the caliper 250 described above, except that the non-return valve 358 controls the flow of the brake fluid in the passage 357. Thus, when the brakes are applied pressurised fluid will be supplied to the brake fluid inlet 345. Pressurised fluid will then flow along the first brake fluid passage 356 in the direction of arrow A to the piston and cylinder assemblies 354 in the limb 352. Pressurised fluid will also flow through the non-return valve 358 and along the passage 357 in the direction of arrow B to the piston and cylinder assemblies 355 in the other limb 353.

When the brakes are released, brake fluid will be drawn from the brake fluid outlet 342. The brake fluid within the second brake fluid passage 357 is constrained to move in the direction of arrow B because of the non-return valve 358 and hence will tend to move towards and out of the outlet 342. The brake fluid in the passage 356 is prevented from returning through the inlet 345 because of the non-return valve which acts between the first chamber of the master cylinder 211 and the brake application line 236 and will tend to flow in the direction of arrow A towards the outlet 342.

Figure 9:
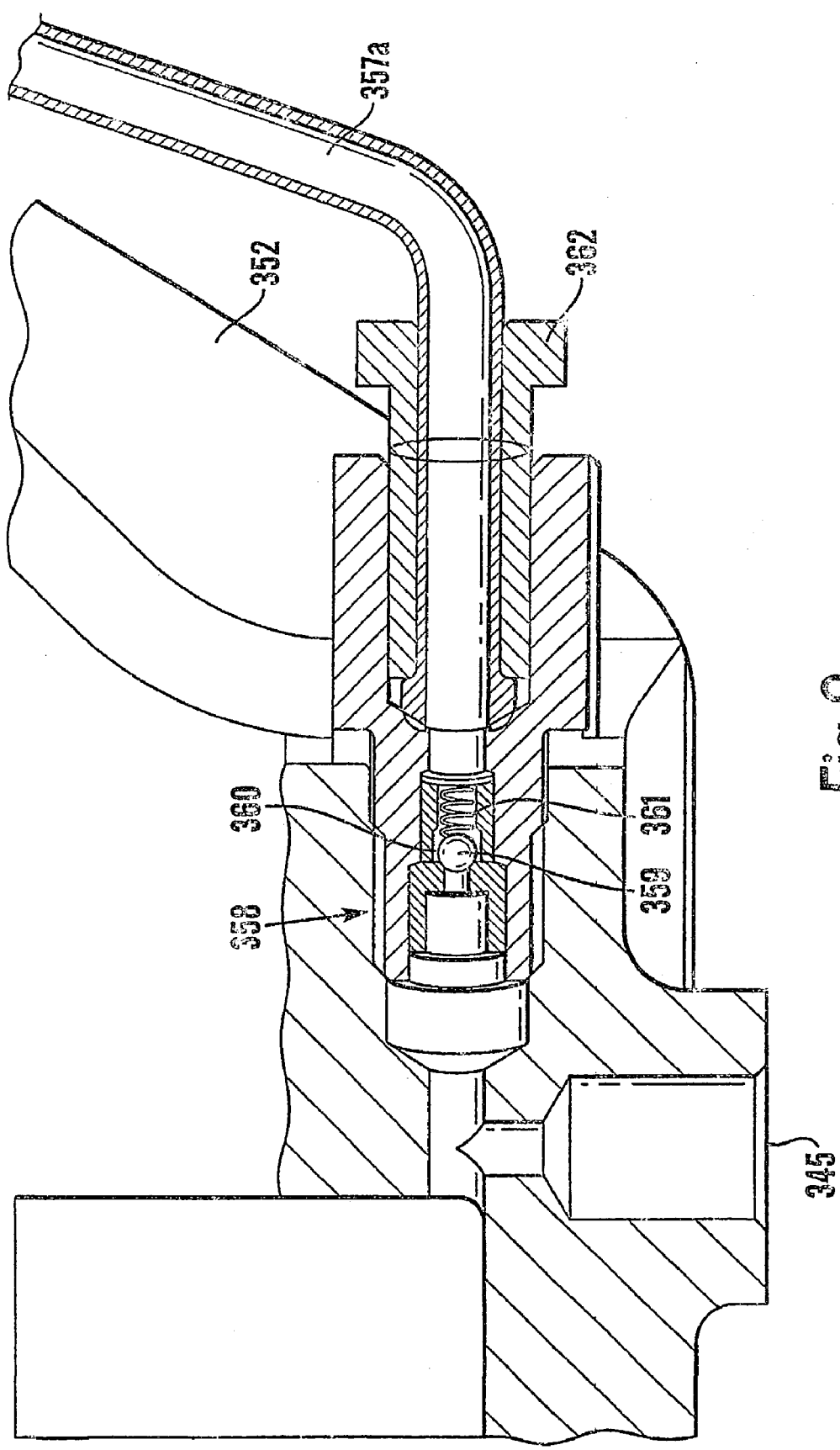
FIG. 9 is a detailed view in an enlarged scale of a non-return valve used in the brake caliper of FIG. 8.

The non-return valve 358 is shown in more detail in FIG. 9 and has a ball 359 which is biased into engagement with a valve seat 360 by a spring 361. The bias force of the spring 361 is selected so as to be sufficient to hold the ball in contact with the valve seat when the brakes are released to inhibit movement of the fluid from the passage 356 into the passage 357.

The calipers shown in FIGS. 7 to 9 are only examples which may modified. In particular, additional non-return valve means could be used to further control movement of the brake fluid within the calipers. For example non-return valves could be provided in both fluid passages in the calipers.

It should be understood that the use of non-return valves to control the circulation of brake fluid within a brake having two or more actuators connected in parallel is not limited to application to disc brakes having calipers of the opposed piston type. This aspect of the invention could equally be applied to disc brakes having any form of caliper in which two or more actuators are connected in parallel. Indeed this aspect of the invention can also be applied to drum brakes having two or more brake cylinders connected in parallel.

It should also be understood that brakes in accordance with the fourth aspect of the invention, such as the those described above in relation to FIGS. 7 to 9, are not limited to use with brake circuits in accordance with the first aspect of the invention but can equally be used in any brake circuit which circulates brake fluid from the master cylinder to the brake means via an application line and back to the master cylinder via a return line. For example they can be used brake circuits in accordance with U.S. Pat. Nos. 5,310,252 and 5,350,223.

It should be further understood that any suitable brake means can be employed in the brake circuits in accordance with the first aspect of the invention. Such circuits need not comprise brakes in accordance with the fourth aspect of the invention but can comprise conventional brake calipers and/or drum brakes that do not have non-return valve means to prevent or reduce internal circulation of brake fluid.

The invention claimed is:

1. A brake circuit comprising brake means connected with a master cylinder via a brake application line and a brake return line, the brake master cylinder having a first chamber in which brake fluid is pressurized on movement of a first piston in a brake applying direction by an operating means, the first chamber being connected via a first port and a non-return valve with the brake application line of the circuit, characterized in that the brake master cylinder further comprises a second chamber connected to the brake return line of the circuit via a second port and having a second piston, said second piston having an outer circumference and a seal mounted about the outer circumference for sealingly engaging a bore of the cylinder which defines said second chamber, said second piston being moveable by the brake operating means in brake applying and releasing directions, the second chamber also being connected to a reservoir via a third port when the second piston is in a fully released position, the second chamber being arranged to draw-in brake fluid from the brake return line on movement of the second piston in a brake releasing direction by the operating means and establishing a connection with the associated reservoir via the third port to allow escape of aerated fluid into the reservoir when the second piston is in the fully released position, providing an arrangement such that during each application and subsequent release of the brakes, a small volume of brake fluid is displaced from the first chamber into the brake application line and a small volume of fluid is drawn out of the brake return line into the second chamber thereby circulating brake fluid through the brake means.

2. A circuit according to claim 1 in which the brake means comprises two or more brakes connected in parallel with the brake application and brake return lines.

3. A circuit according to claim 1 in which the brake means comprises two or more brakes connected in series with the brake application and brake return lines.

4. A circuit according to claim 1 in which front brakes of a vehicle are connected with a first master cylinder and rear brakes of the vehicle are connected with a second master cylinder.

5. A brake circuit comprising brake means connected with a master cylinder via a brake application line and a brake return line, the brake master cylinder having a first chamber in which brake fluid is pressurized on movement of a first piston in a brake applying direction by an operating means, the first chamber being connected via a first port and a non-return valve with the brake application line of the circuit, characterized in that the brake master cylinder further comprises a second chamber connected to the brake return line of the circuit via a second port and having a second piston moveable by the brake operating means in brake applying and releasing directions, the second chamber also connected to a reservoir via a third port when the second piston is in a fully released position, the second chamber being arranged to draw-in brake fluid from the brake return line on movement of the second piston in a brake releasing direction by the operating means and establishing a connection with the associated reservoir via the third port to allow escape of aerated fluid into the reservoir when the second piston is in the fully released position, wherein the first and second master cylinder pistons operate one behind the other in a common bore with the second piston pushing the first piston along the bore under the brake applying movement of the operating means thereby circulating brake fluid through the brake means.

6. A circuit according to claim 5 in which the first piston is biased towards the second piston by spring means acting between a housing of the master cylinder and the first piston.

7. A circuit according to claim 5 in which the master cylinder includes a third chamber within the common bore on the operating means side of the second piston, the third chamber being connected with the reservoir.

8. A circuit according to claim 1 in which a bleed port opens into the second chamber of the master cylinder.

9. A circuit according to claim 1 in which the master cylinder is a modified standard tandem master cylinder having two actuating chambers with one brake actuating chamber acting as the first chamber and the other actuating chamber acting as the second chamber.

10. A circuit according to claim 1, in which the brake means comprises at least one brake having two or more brake actuators connected in parallel, further non-return valve means being provided to prevent or reduce circulation of the brake fluid between the parallel connected actuators of the brake.

11. A circuit according to any one of claims 1 to 10.

12. In a brake circuit having a brake means connected with a master cylinder via a brake application line and a separate brake return line, the master cylinder having a first chamber wherein brake fluid is pressurized by movement of a first piston in a brake applying direction by an operating means, the first chamber connected via a first port with the brake application line of the circuit and the brake means, the improvement comprising:

a non-return valve at the first port for preventing leaking back of fluid into the first chamber during release of the brake means and facilitating brake fluid circulation;

a second chamber in the master cylinder, said second chamber connected to the brake return line and the same brake means via a second port;

a second piston in the master cylinder movable by the brake operating means in brake applying and releasing directions wherein brake fluid is drawn from the brake return line to the second chamber when the second piston is moving in the brake releasing direction, said piston having an outer circumference and a seal mounted about the outer circumference for sealingly engaging a bore of the cylinder which defines the second chamber; and a third port in the second chamber, said third port positioned for permitting the second chamber to communicate with a reservoir only when the second piston is in a fully released position for prohibiting fluid drawn into the second chamber from the reservoir when the second piston is moving in the brake releasing direction, wherein said second chamber configured for drawing in brake fluid from the brake return line through the second port via movement of the second piston in a brake releasing direction by the operating means and establishing a connection with the associated reservoir via the third port to allow escape of aerated fluid into the reservoir only when the second piston is in the fully released position, thereby circulating brake fluid through the brake means.

\* \* \* \* \*